United States Patent
Thon

(10) Patent No.: US 11,383,680 B1
(45) Date of Patent: Jul. 12, 2022

(54) HYDRAULIC LIFTING MECHANISM FOR A LARGE VEHICLE TRAILER

(71) Applicant: Ronald Thon, Yankston, SD (US)

(72) Inventor: Ronald Thon, Yankston, SD (US)

( * ) Notice: Subject to any disclaimer, the term of this patent is extended or adjusted under 35 U.S.C. 154(b) by 0 days.

(21) Appl. No.: 17/149,083

(22) Filed: Jan. 14, 2021

(51) Int. Cl.
| | | |
|---|---|---|
| B60S 9/20 | (2006.01) | |
| B60S 9/22 | (2006.01) | |
| B60D 1/66 | (2006.01) | |
| B62D 53/08 | (2006.01) | |
| B60D 1/46 | (2006.01) | |
| B60D 1/06 | (2006.01) | |
| F15B 15/14 | (2006.01) | |
| B60D 1/14 | (2006.01) | |
| B60S 9/215 | (2006.01) | |

(52) U.S. Cl.
CPC ............... B60S 9/20 (2013.01); B60D 1/06 (2013.01); B60D 1/141 (2013.01); B60D 1/465 (2013.01); B60D 1/665 (2013.01); B60S 9/215 (2013.01); B60S 9/22 (2013.01); B62D 53/0842 (2013.01); B62D 53/0864 (2013.01); F15B 15/14 (2013.01)

(58) Field of Classification Search
CPC ........ B60D 1/141; B60D 1/465; B60D 1/665; B62D 53/0864; B60S 9/20; B60S 9/22
USPC ........................................... 280/476.1
See application file for complete search history.

(56) References Cited

U.S. PATENT DOCUMENTS

| | | | |
|---|---|---|---|
| 3,482,853 A | 12/1969 | Raidel | |
| 3,779,407 A * | 12/1973 | Gillem | B60P 3/127 |
| | | | 280/476.1 |
| 4,211,299 A * | 7/1980 | Schulte | B60S 9/20 |
| | | | 403/108 |
| 4,629,020 A * | 12/1986 | Thurman | B62D 49/007 |
| | | | 280/421 |
| 6,726,235 B2 | 4/2004 | McCarty | |
| 6,820,887 B1 | 11/2004 | Riggle | |
| 7,328,761 B1 | 2/2008 | Tyler | |
| 7,931,108 B2 | 4/2011 | Feldhaus | |
| 7,934,743 B1 | 5/2011 | Wall et al. | |
| 8,919,802 B2 * | 12/2014 | Knight | B60D 1/665 |
| | | | 280/476.1 |
| 9,371,060 B2 | 6/2016 | Smith | |
| 9,776,667 B2 | 10/2017 | Hill et al. | |
| 10,005,503 B2 * | 6/2018 | Fehr | B62D 49/065 |

OTHER PUBLICATIONS

Power Trailer Mover. Product Listing [online]. © 2017 DJ Products Inc. [retrieved on Apr. 30, 2020]. Retrieved from the Internet: <URL: https://www.teamcartcaddy.com/industry/car-truck-trailer-pullers/power-trailer-mover>.

* cited by examiner

Primary Examiner — Kevin Hurley
Assistant Examiner — Hosam Shabara
(74) Attorney, Agent, or Firm — Cramer Patent & Design, PLLC; Aaron R. Cramer

(57) ABSTRACT

A hydraulic lifting mechanism for a large vehicle trailer comprises a square tubular metallic frame having a base and an upright support structure. A pair of pivoting wheels are disposed at a first base side of the base while a pair of wheels upon an axle are disposed upon a second base side of the base opposite the pivoting wheels. A four armed hydraulic lift is secured upon the upright support structure. At a distal end of the four armed hydraulic lift is a trailer hitch ball. The device is removably securable to a tractor.

20 Claims, 7 Drawing Sheets

HYDRAULIC LIFTING MECHANISM FOR A LARGE VEHICLE TRAILER

RELATED APPLICATIONS

Non-applicable.

FIELD OF THE INVENTION

The present invention relates generally to the field of hydraulic lifting mechanisms and more specifically to hydraulic lifting mechanisms for large vehicle trailers.

BACKGROUND OF THE INVENTION

There are countless types of trailers on the road today. Two of the most common types of trailers are gooseneck and fifth wheel trailers. Such trailer styles are commonly used in fifth wheel recreational vehicles towed by pickup trucks. They also see use as horse trailers, equipment trailers and the like. As with any type of vehicle, they spend much of their time parked, or perhaps even in a repair facility.

While in such locations, they may have to be moved to another storage location or in and out of a repair bay. Since the tow vehicle is typically not present, this represents a great deal of effort to find the proper vehicle and hitch type, hook up the trailer, move it, and then unhitch it. This not only takes a great deal of time to physically perform, but also means that all other work must wait on the trailer to be moved. Accordingly, there exists a need for a means by which a fifth wheel and gooseneck style trailers can be easily and quickly moved without a dedicated tow vehicle or specific type/size of hitch. The development of the lifting device for trailers 10 fulfills this need.

SUMMARY OF THE INVENTION

To achieve the above and other objectives, the present invention provides for a lifting device which has a pair of support tires which are adapted to support a trailer, a fixed frame having a vertical member, a horizontal member, and a pair of diagonal members, a connection to the trailer which is adapted to a moving machine to move the trailer in a forward or a reverse direction and is lifted free of the fixed frame when raised. The connection is a fifth wheel connection and a gooseneck connection. The lifting device has a plurality of movable elements which allow movement of the fifth wheel connection and the gooseneck connection along an elevational travel path. The movable elements are connected to a post and the vertical member by a plurality of bearing connections.

The lifting device also has a pair of three-point hitch connections and an upper three-point hitch connection adapted to attach an alternate moving machine, an axle assembly which mechanically communicates with a lower surface of the third cross member to support the pair of support tires. The pair of support tires may be connected to the axle assembly and supported by the third cross member. The lifting device also has a hydraulic cylinder which is attached to the horizontal member. The hydraulic cylinder serves as an adjustable connection on the post. The hydraulic cylinder allows the post to be raised and lowered along the elevational travel path with respect to the fixed frame that includes the vertical member, the horizontal member, and the pair of diagonal members. The pair of support tires are connected to the axle assembly and supported by the third cross member.

The lifting device also has a pendant control on a pendant cable raising and lowering the post via the hydraulic cylinder, a first pair of bearing shafts which are attached to the main center supports and the side supports via a plurality of multiple bearing connections. The first pair of bearing shafts support the post at a distal end of the movable elements. The lifting device also has a second pair of bearing shafts which support the post at the movable elements and a third bearing shaft which is disposed between a pair of angle supports. The third bearing shaft provides structural support for the hydraulic cylinder. The lifting device also has a battery which provides an electrical power to an electric motor provided as part of a hydraulic pump and valve assembly and a pressure relief valve which provides over-pressurization protection with a return flow to a hydraulic reservoir.

The pendant control controls the pressure relief valve via the pendant cable. The electric motor drives the hydraulic pump and valve assembly. The hydraulic pump and valve assembly draws from the hydraulic reservoir and flows to a hydraulic control valve. The return path from the hydraulic control valve returns to the hydraulic reservoir. The pressure relief valve flows to the hydraulic cylinder where a piston provides force to move a repositioning travel path in a vertical direction.

The trailer may be a fifth wheel recreational vehicle selected from the group consisting of a travel trailer, a boat trailer, a utility trailer, a horse trailer, or a flatbed trailer. The pair of diagonal members may connect the first cross member and the third cross member. The first cross member and the vertical member may provide a point of attachment for a skid steer machine attachment plate. The fifth wheel connection may include an aperture to enable coupling of a king pin. The gooseneck connection may include a hitch ball. The moving machine may provide for steering and side to side motion of the trailer.

The bearing connections may include four bearing connections. The movable elements may include a pair of main center supports with a pair of intermediate bracing elements and a pair of side supports and a pair of angled side supports. Motion of the hydraulic cylinder may be provided by the battery, the hydraulic pump and valve assembly, and the hydraulic reservoir. The alternate moving machine may be a tractor. The fixed frame may include the first cross member, the second cross member, and the third cross member to provide additional support to the fixed frame. The upper three-point hitch connection may be attached to the first cross member, as well as an intermediate vertical member. The vertical member and the intermediate vertical member may be positioned between the first cross member and the second cross member. The upper three-point hitch connection may be mounted to the first cross member and the intermediate vertical member while the pair of lower three-point hitch connection may be connected to the second cross member.

The pendant control on the pendant cable may provide for no reliance on other portable or stationary power sources, nor reliance on power sources on the moving machine. The lifting device may be made of steel stock that may be cut to size and welded together. The lifting device may be four feet wide by four feet tall by five feet long. The lifting device may support a maximum weight of three-thousand-five-hundred pounds.

BRIEF DESCRIPTION OF THE DRAWINGS

The advantages and features of the present invention will become better understood with reference to the following

DESCRIPTIVE KEY

Figure 1:
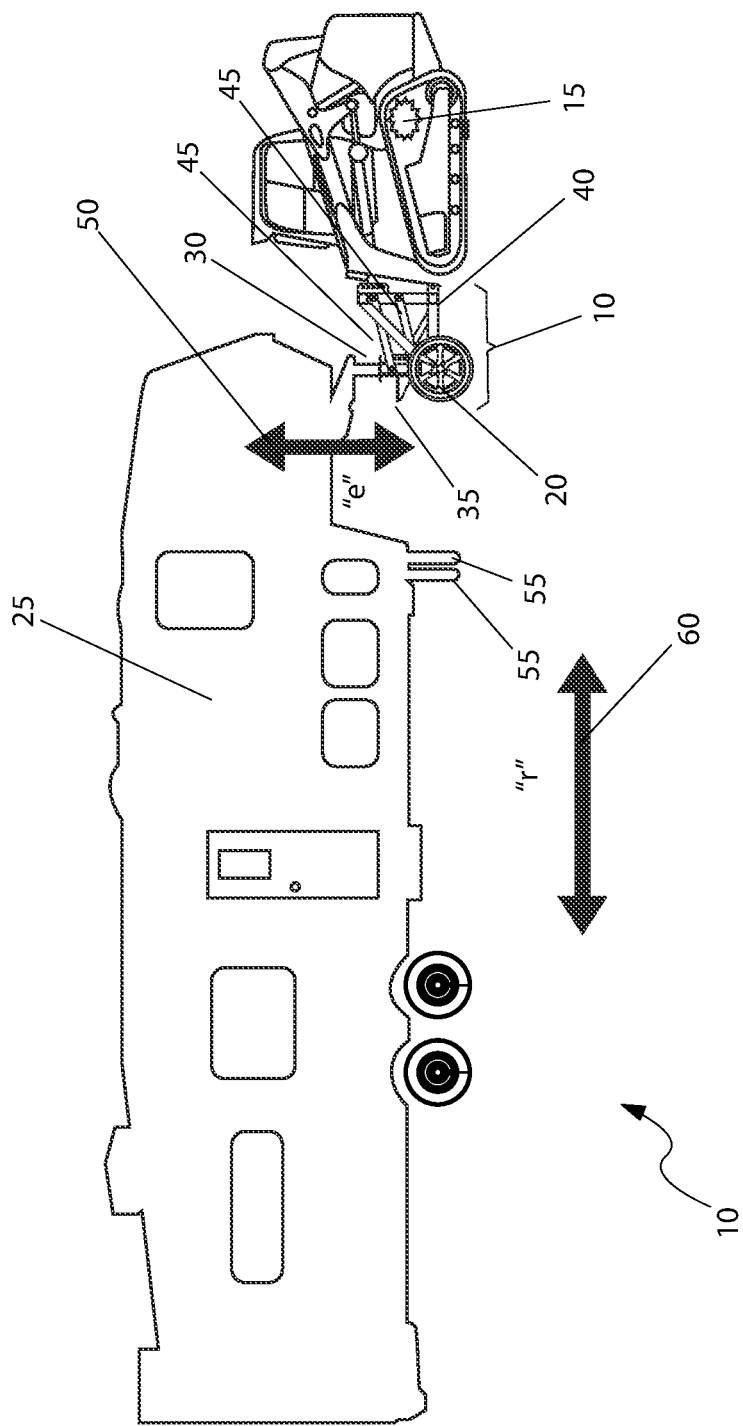
FIG. 1 is an overall side view of the lifting device, shown in a utilized state with a moving machine and a trailer, according to the preferred embodiment of the present invention.

10 lifting device
15 moving machine
16 alternate moving machine
20 support tire
25 trailer
30 fifth wheel connection
31 aperture
35 gooseneck connection
36 hitch ball
40 fixed frame
45 movable element
50 elevational travel path "e"
55 fixed supporting means
60 repositioning travel path "r"
65 post
70 vertical member
75 horizontal member
80 diagonal member
85 bearing connection
90 first cross member
95 second cross member
100 third cross member
105 lower three-point hitch connection
110 upper three-point hitch connection
115 axle assembly
120 hydraulic cylinder
125 adjustable connection
130 intermediate vertical member
135 main center support
140 intermediate bracing
145 side supports
150 angled side support
155 first bearing shaft
160 second bearing shaft
165 battery
170 hydraulic pump and valve assembly
175 hydraulic reservoir
180 pendant control
185 pendant cable
190 third bearing shaft
195 angle support
200 electric motor
205 hydraulic pump
210 hydraulic control valve
215 pressure relief valve
220 piston

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 7:
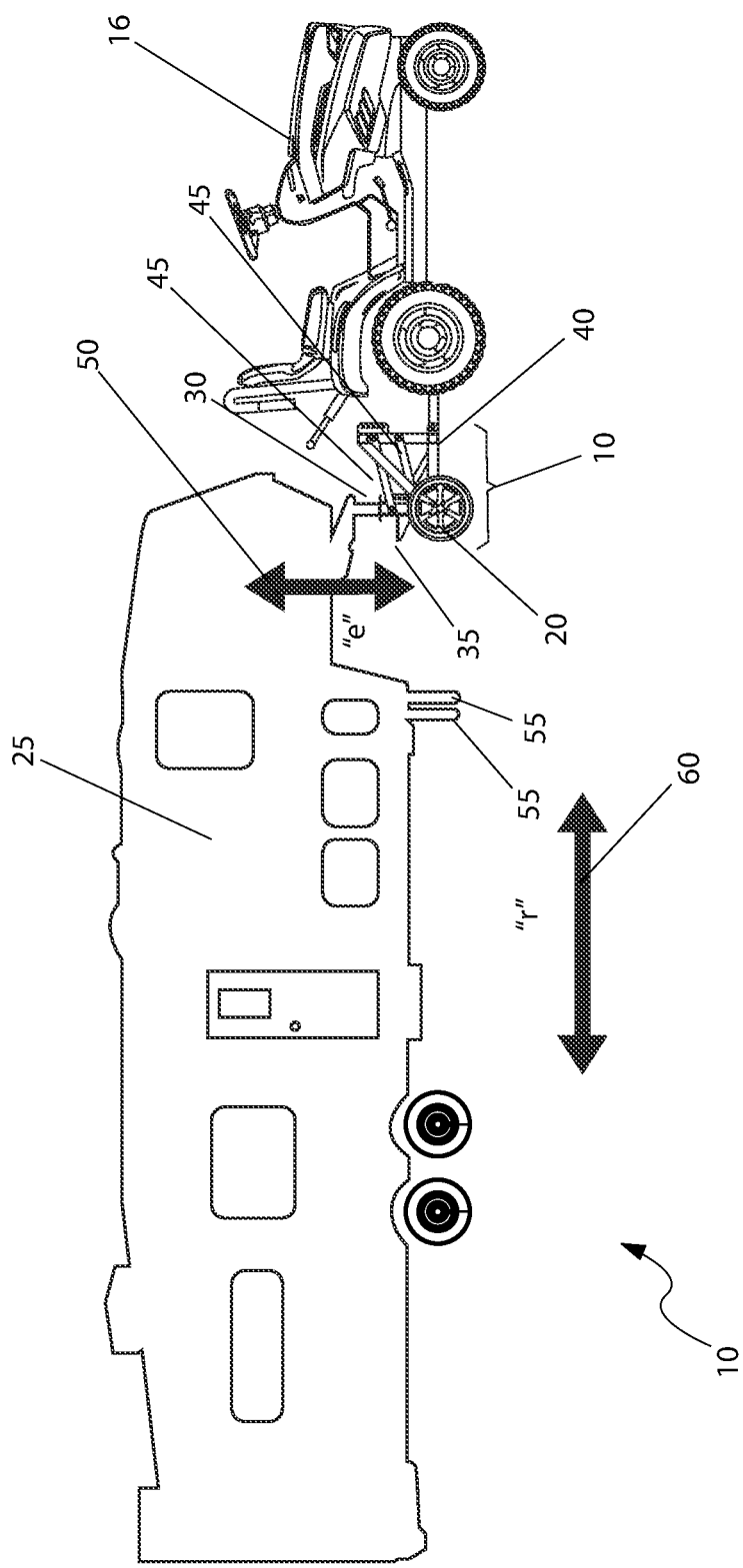
FIG. 7 is an overall side view of the lifting device, shown in a utilized state with an alternate moving machine and a trailer, according to an alternate embodiment of the present invention.

Referring now to FIGS. 1 and 7, an overall side view of the lifting device 10, shown in a utilized state with a moving machine 15 (FIG. 1), an alternate moving machine 16 (FIG. 7), and a trailer 25, according to the preferred embodiment of the present invention is disclosed. The lifting device 10 (herein also described as the "device") 10, adapts usage of a moving machine 15, such as a skid steer machine, an alternate moving machine, such as a three-point attachment that may be utilized as a tractor, or similar device to move or reposition trailers 25 for relatively short distances such as in storage or repair facilities.

The device 10 is supported on two (2) support tires 20, of which only one (1) is shown due to illustrative limitations. The device 10 has the approximate dimensions of four feet wide by four feet tall by five feet long (4×4×5 ft.) and is envisioned to be made of steel stock that is cut to size, machined as required, and welded together. However, the dimensions and material of construction are not intended to be a limiting factor of the present invention. The device 10 is in mechanical communication with a trailer 25, such as a fifth wheel recreational vehicle (as shown), a travel trailer, a boat trailer, a utility trailer, a horse trailer, a flatbed trailer, or the like through the use of either a fifth wheel connection 30 (as utilized) and a gooseneck connection 35. The device 10 provides for a fixed frame 40 and movable elements 45 which will be described in greater detail herein below. The movable elements 45 allow movement of the fifth wheel connection 30 and the gooseneck connection 35 along an elevational travel path "e" 50. When raised, the trailer 25 is lifted free of its fixed supporting means 55, allowing the moving machine 15 to move the trailer 25 along either a forward or reverse direction. During said movement, the moving machine 15 provides for steering and side to side motion of the trailer 25 as well.

Figure 2:
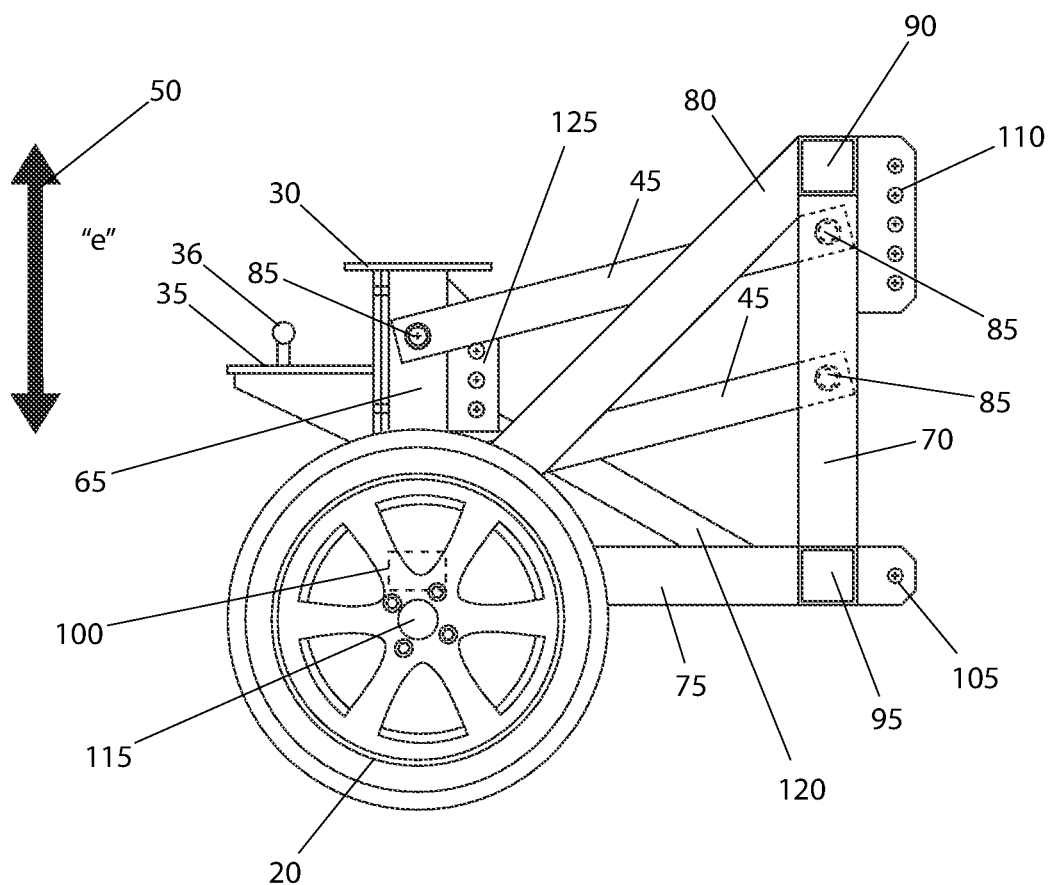
FIG. 2 is a side view of the lifting device, with the fifth wheel connection and gooseneck connection in its lowest position, according to the preferred embodiment of the present invention.
Figure 2:
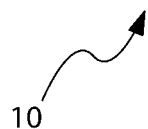

Referring next to FIG. 2, a side view of the device 10, with the fifth wheel connection 30 and gooseneck connection 35 in its lowest position, according to the preferred embodiment of the present invention is depicted. The fifth wheel connection 30 and gooseneck connection 35 sit upon a post 65 supported by the movable elements 45. The fifth wheel connection 30 incorporates an aperture 31 to enable coupling of a king pin. The gooseneck connection 35 incorporates a hitch ball 36, which is preferably a one and seven-eighths inch (1⅞ in.) variety, although other sizes are anticipated based on the connection required. The fixed frame 40 includes a vertical member 70, a horizontal member 75 and a diagonal member 80. The movable elements 45 are connected to the post 65 and the vertical member 70 by use of four (4) bearing connections 85, of which only three (3) are shown due to illustrative limitations. A first cross member 90, a second cross member 95, and a third cross member 100 (shown via dashed lines due to its hidden state) provide physical communication to an assembly the mirror image of FIG. 2 on the opposite side. Further description of said arrangement will be provided herein below.

Two (2) lower three-point hitch connections 105 (of which only one (1) is shown due to illustrative limitations) and one (1) upper three-point hitch connection 110 provided for the physical attachment of the device 10 to an alternate moving machine 16, such as a tractor (FIG. 7). An axle assembly 115 is in mechanical communication with the lower surface of the third cross member 100 and supports the support tires 20. A hydraulic cylinder 120 shown in a retracted state is attached through indirect physical communication with the horizontal member 75 as well as an adjustable connection 125 on the post 65. The hydraulic cylinder 120 allows the post 65 to be raised and lowered along the elevational travel path "e" 50 with respect to the fixed frame 40 (as shown in FIG. 1) consisting of the vertical member 70, the horizontal member 75 and the diagonal member 80.

Figure 3:
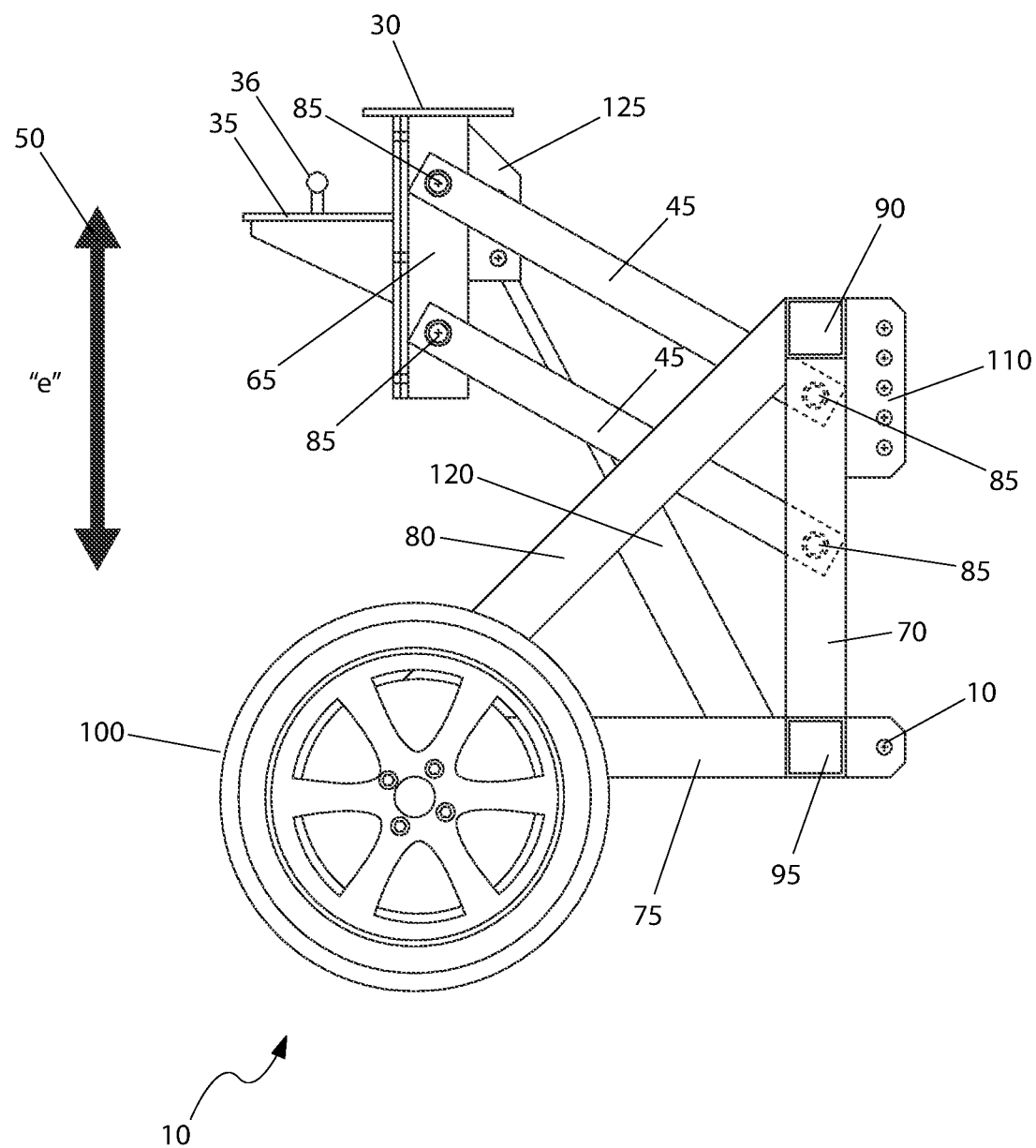
FIG. 3 is a side view of the lifting device, with the fifth wheel connection 30 and gooseneck connection in its highest position, according to the preferred embodiment of the present invention.

Referring now to FIG. 3, a side view of the device 10, with the fifth wheel connection 30 and gooseneck connection 35 in its highest position, according to the preferred embodiment of the present invention is shown. The physical arrangement of the vertical member 70, the horizontal member 75, the diagonal member 80, two (2) of the four (4) bearing connections 85, the first cross member 90, the second cross member 95, the third cross member 100, the lower three point hitch connection 105, and the upper three point hitch connection 110, remain as is shown in FIG. 2. The post 65, the fifth wheel connection 30, the gooseneck connection 35, the adjustable connection 125, the remaining two (2) bearing connections 85, and the hydraulic cylinder 120 are now elevated to the upper end of the elevational travel path "e" 50. The hydraulic cylinder 120 is shown in an extended position. Operation of the hydraulic cylinder 120 will be described in greater detail herein below. The weight of the trailer 25 (as shown in FIG. 1), commonly referred to as "tongue weight" is born by the device 10 includes the support tires 20. It is envisioned that the device 10 can support a maximum weight of three-thousand-five-hundred pounds (3,500 lbs.).

Figure 4:
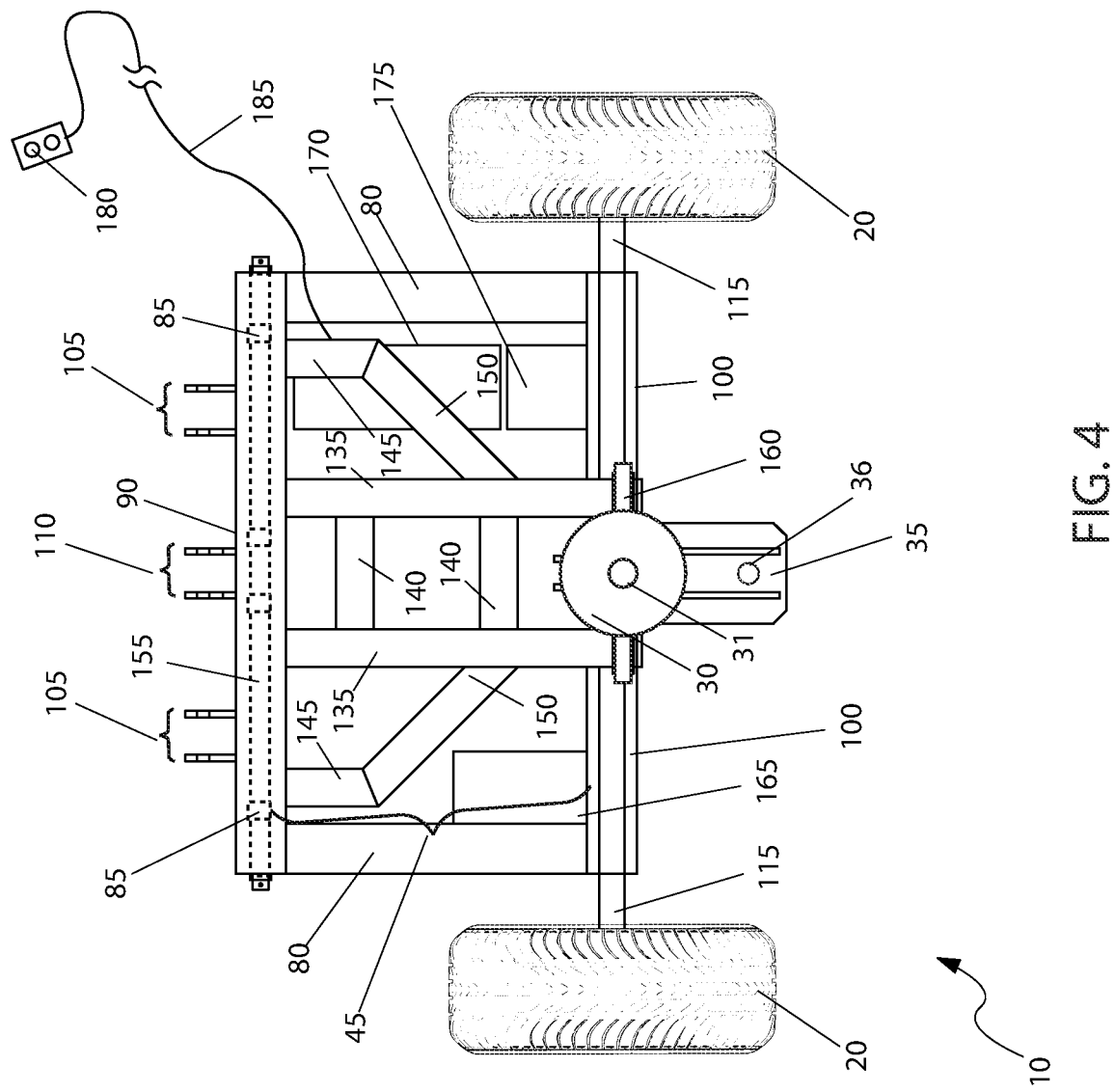
FIG. 4 is a top view of the lifting device, according to the preferred embodiment of the present invention.

Referring next to FIG. 4, a top view of the device 10, according to the preferred embodiment of the present invention is disclosed. The two (2) support tires 20 are connected to the axle assembly 115 and supported by the third cross member 100. The two (2) diagonal members 80 connect between the first cross member 90 and the third cross member 100. The lower three-point hitch connection 105 connect to the second cross member 95 (not shown in this figure due to illustrative limitations) while the upper three-point hitch connection 110 is attached to the first cross member 90, as well as an intermediate vertical member 130. The movable elements 45 are comprised of two (2) main center supports 135 with two (2) intermediate bracing elements 140 on the interior, and two (2) side supports 145 and two (2) angled side supports 150 on the exterior. It is noted that the arrangement of the main center supports 135, the intermediate bracing 140, the side supports 145 and the angled side supports 150 are repeated under the arrangement shown and are thus in pairs. These arrangement pairs (previously depicted as movable elements 45) are supported by two (2) first bearing shafts 155 (of which only one (1) is shown due to illustrative limitations) which hold the previously described bearing connections 85. A set of two (2) second bearing shafts 160 (of which only one (1) is shown due to illustrative limitations) support the post 65 at the distal end of the movable elements 45. The post 65 is then in mechanical communication with the fifth wheel connection 30 and the gooseneck connection 35 as aforementioned described. Motion of the hydraulic cylinder 120 (as shown in FIG. 2 and FIG. 3) is provided by a battery 165, a hydraulic pump and valve assembly 170 and a hydraulic reservoir 175. Control of the raising and lowering of the post 65 via the hydraulic cylinder 120, is afforded by a pendant control 180 on a pendant cable 185, which provides for completely self-contained operation of the device 10 and no reliance on other portable or stationary power sources, nor reliance on power sources on the moving machine 15 (as shown in FIG. 1).

Figure 5:
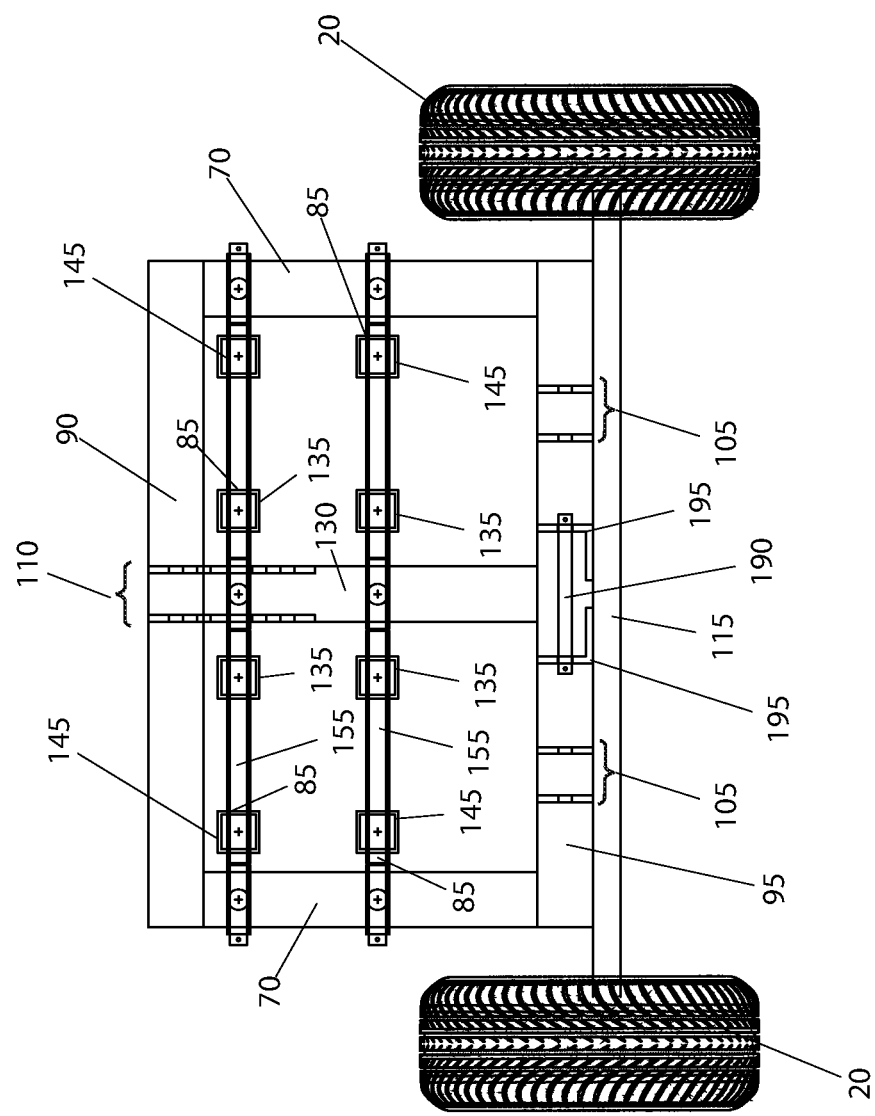
FIG. 5 is a rear view of the lifting device, according to the preferred embodiment of the present invention.

Referring now to FIG. 5, a rear view of the device 10, according to the preferred embodiment of the present invention is depicted. The support tires 20 are in physical communication with the axle assembly 115. The two (2) vertical members 70 and the intermediate vertical member 130 are positioned between the first cross member 90 and the second cross member 95. The upper three-point hitch connection 110 is mounted to the first cross member 90 and the intermediate vertical member 130 while the two (2) lower three-point hitch connection 105 are connected to the second cross member 95. A third bearing shaft 190 is positioned between two (2) angle supports 195 and provides structural support for the hydraulic cylinder 120 (as shown in FIGS. 2 and 3). The main center supports 135 and the side supports 145 are attached to the two (2) first bearing shafts 155 via multiple bearing connections 85. The first cross member 90 and the vertical member 70 provide a point of attachment for a skid steer machine attachment plate.

Figure 6:
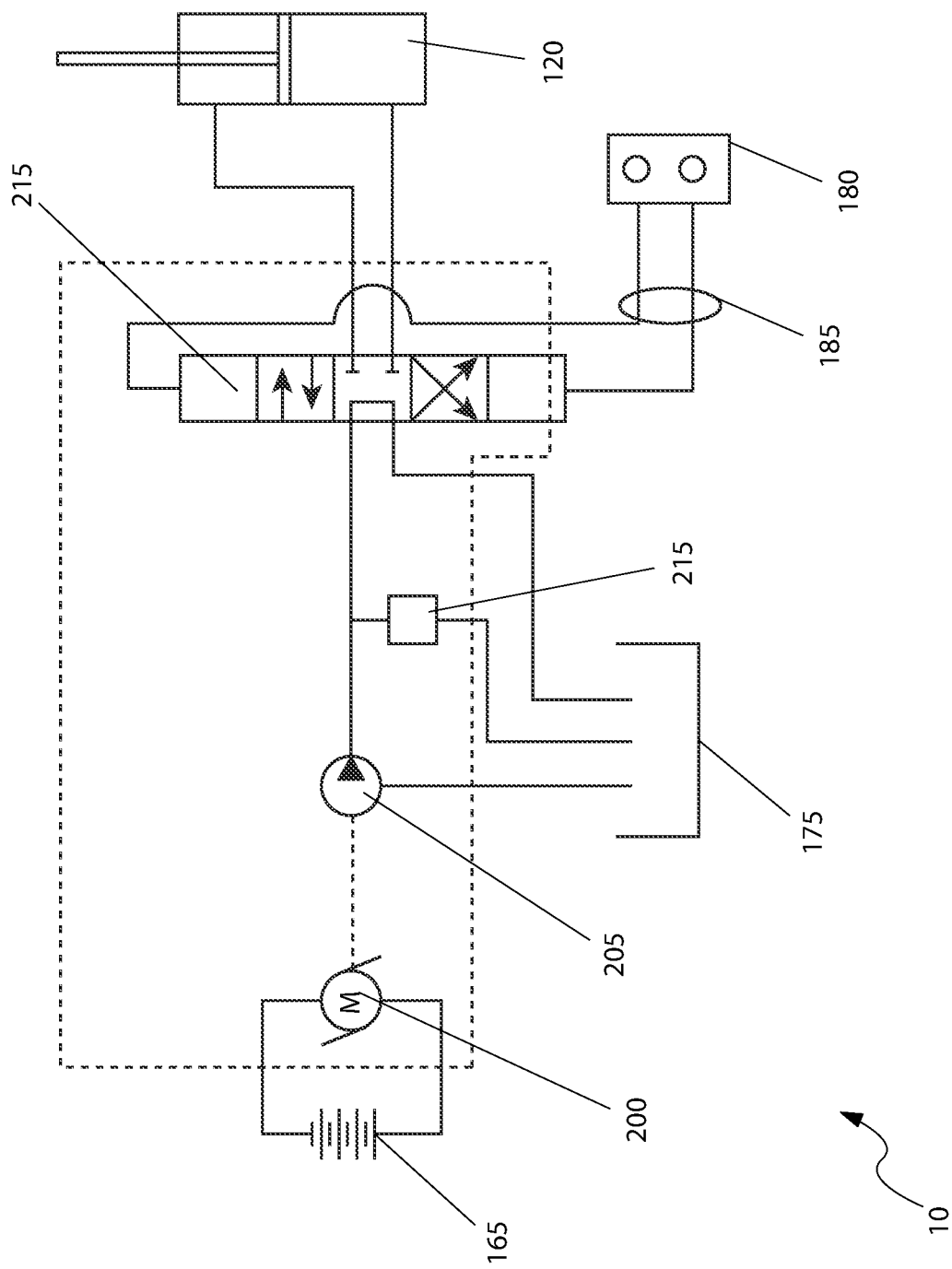
FIG. 6 is an electrical/mechanical block diagram of the lifting device for trailers, according to the preferred embodiment of the present invention.

Referring to FIG. 6, an electrical/mechanical block diagram of the device 10, according to the preferred embodiment of the present invention is shown. The battery 165 provides power to an electric motor 200 provided as part of the hydraulic pump and valve assembly 170. The electric motor 200 drives a hydraulic pump 205. The hydraulic pump 205 draws from the hydraulic reservoir 175 and flows to a hydraulic control valve 210. The return path from the hydraulic control valve 210 returns to the hydraulic reservoir 175. A pressure relief valve 215 provides over-pressurization protection with a return flow to the hydraulic reservoir 175 as well. The pendant control 180 controls the pressure relief valve 215 via the pendant cable 185. Output from the pressure relief valve 215 then flows to the hydraulic cylinder 120 where a piston 220 provides the force to move the repositioning travel path "r" 60 (as shown in FIG. 2) in a vertical direction.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as heavy equipment suppliers, farm supply stores, trailer manufacturers, mail order and internet supply houses and the like.

After procurement and prior to utilization, the device 10 would be prepared in the following manner: the device 10 would be attached to a moving machine 15, such as a skid steer via connection to the vertical member 70 and the first cross member 90, or alternately the device 10 would be attached to an alternate moving machine 16, such as a tractor, via use of the lower three point hitch connection 105 and the third cross member 100; the battery 165 would be fully charged; and the repositioning travel path "r" 60 would be lowered to the lowest position as shown in FIG. 2.

During utilization of the device 10, the following procedure would be initiated: the moving machine 15 (or alternate moving machine 16) would position the device 10 under the trailer 25; using the pendant control 180, the repositioning travel path "r" 60 would be raised along the elevational travel path "e" 50 to connect either the fifth wheel connection 30 or the gooseneck connection 35 as required. With the trailer 25 raised off the fixed supporting means 55, the trailer 25 is then driven to its desired location via the moving machine 15 (or alternate moving machine 16). The process is then reversed to lower the trailer 25 and disengage the device 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A lifting device, comprising:
a pair of support tires adapted to support a trailer;
a fixed frame having a vertical member, a horizontal member, and a pair of diagonal members;
a connection to the trailer adapted to a moving machine to move the trailer in a forward or a reverse direction and is lifted free of the fixed frame when raised, the connection is a fifth wheel connection and a gooseneck connection;
a plurality of movable elements allowing movement of the fifth wheel connection and the gooseneck connection along an elevational travel path, the movable elements are connected to a post and the vertical member by a plurality of bearing connections;
a pair of three-point hitch connections and an upper three-point hitch connection adapted to attach an alternate moving machine;
an axle assembly mechanically communicating with a lower surface of the third cross member to support the pair of support tires, the pair of support tires are connected to the axle assembly and supported by the third cross member;
a hydraulic cylinder attached to the horizontal member, the hydraulic cylinder serves as an adjustable connection on the post, the hydraulic cylinder allows the post to be raised and lowered along the elevational travel path with respect to the fixed frame that includes the vertical member, the horizontal member, and the pair of diagonal members, the pair of support tires are connected to the axle assembly and supported by the third cross member;
a pendant control on a pendant cable raising and lowering the post via the hydraulic cylinder;
a first pair of bearing shafts attached to the main center supports and the side supports via a plurality of multiple bearing connections, the first pair of bearing shafts supporting the post at a distal end of the movable elements;
a second pair of bearing shafts supporting the post at the movable elements;
a third bearing shaft disposed between a pair of angle supports, the third bearing shaft provides structural support for the hydraulic cylinder;
a battery providing electrical power to an electric motor provided as part of a hydraulic pump and valve assembly; and
a pressure relief valve providing over-pressurization protection with a return flow to a hydraulic reservoir;
wherein the pendant control controlling the pressure relief valve via the pendant cable;
wherein the electric motor drives the hydraulic pump and valve assembly;
wherein the hydraulic pump and valve assembly draws from the hydraulic reservoir and flows to a hydraulic control valve;
wherein the return path from the hydraulic control valve returns to the hydraulic reservoir; and
wherein output from the pressure relief valve flows to the hydraulic cylinder where a piston provides force to move a repositioning travel path in a vertical direction.

2. The lifting device, according to claim 1, wherein trailer is a fifth wheel recreational vehicle selected from the group consisting of a travel trailer, a boat trailer, a utility trailer, a horse trailer, or a flatbed trailer.

3. The lifting device, according to claim 1, wherein the pair of diagonal members connect the first cross member and the third cross member.

4. The lifting device, according to claim 1, wherein the first cross member and the vertical member provide a point of attachment for a skid steer machine attachment plate.

5. The lifting device, according to claim 1, wherein the fifth wheel connection includes an aperture to enable coupling of a king pin.

6. The lifting device, according to claim 1, wherein the gooseneck connection includes a hitch ball.

7. The lifting device, according to claim 1, wherein the moving machine provides for steering and side to side motion of the trailer.

8. The lifting device, according to claim 1, wherein the bearing connections include four bearing connections.

9. The lifting device, according to claim 1, wherein the movable elements include a pair of main center supports with a pair of intermediate bracing elements and a pair of side supports and a pair of angled side supports.

10. The lifting device, according to claim 1, wherein motion of the hydraulic cylinder is provided by the battery, the hydraulic pump and valve assembly, and the hydraulic reservoir.

11. The lifting device, according to claim 1, wherein the alternate moving machine is a tractor.

12. The lifting device, according to claim 1, wherein the fixed frame includes the first cross member, the second cross member, and the third cross member to provide additional support to the fixed frame.

13. The lifting device, according to claim 1, wherein the upper three-point hitch connection is attached to the first cross member, as well as an intermediate vertical member.

14. The lifting device, according to claim 1, wherein the vertical member and the intermediate vertical member are positioned between the first cross member and the second cross member.

15. The lifting device, according to claim 1, wherein the upper three-point hitch connection is mounted to the first cross member and the intermediate vertical member while the pair of lower three-point hitch connection is connected to the second cross member.

16. The lifting device, according to claim 1, wherein the pendant control on the pendant cable which provides for no reliance on other portable or stationary power sources, nor reliance on power sources on the moving machine.

17. The lifting device, according to claim 1, wherein the lifting device is made of steel stock.

18. The lifting device, according to claim 1, wherein the lifting device that is cut to size and welded together.

19. The lifting device, according to claim 1, wherein the lifting device is four feet wide by four feet tall by five feet long.

20. The lifting device, according to claim 1, wherein the lifting device supports a maximum weight of three-thousand-five-hundred pounds.

* * * * *